Sept. 25, 1956 J. T. KOEDDERICH ET AL 2,764,672
MICROSCOPE ILLUMINATOR
Filed Sept. 23, 1955
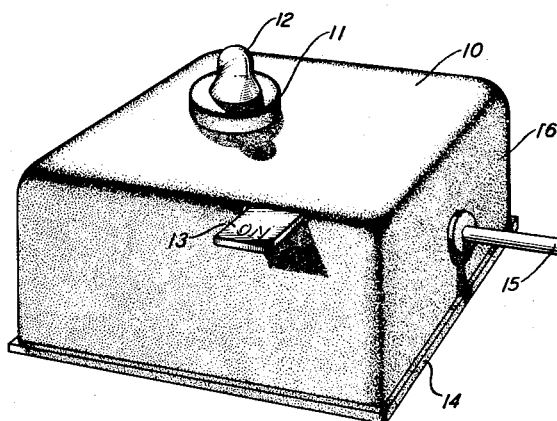
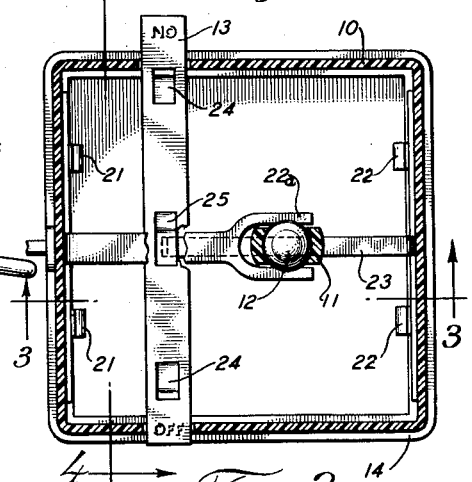
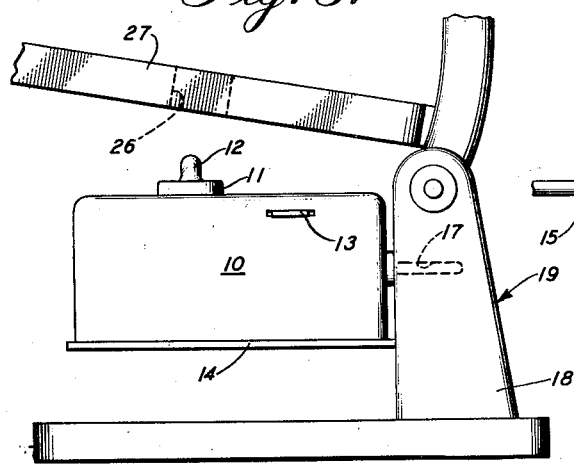
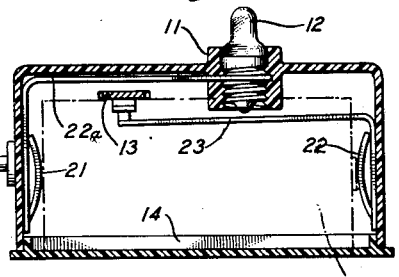
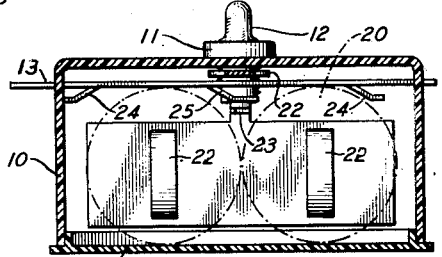
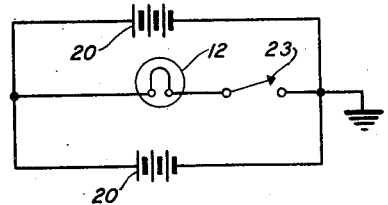
INVENTORS
JOHN T. KOEDDERICH
BY   MAX WEIXELBAUM
Albert F. Kronman
ATTORNEY

United States Patent Office 2,764,672
Patented Sept. 25, 1956

2,764,672

MICROSCOPE ILLUMINATOR

John T. Koedderich, Teaneck, N. J., and Max Weixelbaum, New York, N. Y., assignors to American Thermo-Ware Company, New York, N. Y., a corporation of New York Application September 23, 1955, Serial No. 536,136

3 Claims. (Cl. 240—6.4)

This invention relates to microscopes and specifically to light sources for use in conjunction with microscopes.

Presently known microscopes rely upon a mirror located beneath the stage of the microscope for directing light through the microscope so that the specimen placed thereon may be observed. Where a strong source of external light is not available it has been known to project light coming from an artificial light source at the mirror so as to direct it upwardly through the said microscope.

Where such microscopes have to be moved from place to place the use of the presently known mirror is often inconvenient. Additional sources of light such as the projector referred to above are not always available and may be quite expensive. Students in particular have great difficulties in using known microscopes under any but the most favorable conditions, since the mirror is easily jarred from position. The mirror is also difficult to adjust.

Accordingly, it is an object of the present invention to provide a light source for a microscope which may be incorporated into the structure of said microscope.

Another object of the present invention is to provide a light source which is compatible with the presently known structure of the microscope.

A further object of the present invention is to provide a microscope light source which will have a long useful life.

Another object of the present invention is to provide a microscope light source which will enable the microscope to be carried from place to place, always available for use.

A feature of the present invention is its compact structure.

Another feature of the present invention is its simple switch construction.

A feature of the present invention is its small size and ease of operation.

The invention consists of the construction, combination and arrangement of parts, as herein illustrated, described and claimed.

In the accompanying drawings, forming a part hereof is illustrated one form of embodiment of the invention, and in which:

Figure 1 is a view in perspective of a complete embodiment of the light source in accordance with the present invention.

Figure 2 is a top plan view of the light source shown in Figure 1 with the top portion of the cover member cut away to show the construction of said light source.

Figure 3 is a vertical section taken on line 3—3 in Figure 2, with certain elements shown in dotted lines for the sake of clarity.

Figure 4 is a vertical section taken on line 4—4 in Figure 2.

Figure 5 is a fragmentary view of a microscope showing the manner in which the light source is secured thereto.

Figure 6 is a circuit diagram of a light source in accordance with the present invention.

Referring to the drawings, 10 indicates a case member preferably made of some dielectric material having in the upper portion thereof a socket 11 to receive therethrough a light bulb 12. A flat switch-leaf member 13 is slidably carried beneath the top of the case member 10 for the purpose of making or breaking the contact between the battery elements 20 indicated in dotted lines in Figures 3 and 4, and the terminals of the bulb 12. The case member 10 is provided with a bottom cover member 14 so that access may be had to batteries within the case member 10.

A supporting pin 15 is secured to and extends from the side wall 16 of the cover member 10. The supporting pin 15 is receivable within a bore 17 in the base 18 of a microscope 19. The bore 17 is customarily provided to receive the pin of a mirror (not shown). With the mirror removed the pin 15 may be inserted in the bore 17 to support the light source assembly. Two small batteries 20 indicated by dashed lines in Figures 3 and 4 are carried within the body 10 of the light source and are connected in parallel to opposed pairs of flat spring contact plates 21, 22, which are supported at each end of the battery case 10. The contact plate 21 is connected to a lead 22ª which make contact with the base of the light bulb 12 at all times. The second contact plate 22 is connected to a spring arm 23 which underlies the light bulb 12 and makes contact with the central terminal thereof.

The switch-leaf 13, best shown in Figure 4, has struck therefrom depending fingers 24 which serve to limit the longitudinal travel of said leaf. An arm 25 is downwardly struck from the switch-leaf 13 and overlies the spring arm 23 of the bulb contact. As the switch-leaf 13 is shifted to the "off" position, the depending arm 25 forces the spring arm 23 away from the bulb terminal. The circuit is thereby broken and the bulb does not glow. When the switch-leaf 13 is slid to the "on" position the depending arm is shifted laterally away from the spring arm which then can spring upwardly to close the circuit and cause the batteries to energize the filament of the light bulb 12. The light bulb 12 is located at a point on the top of the case which will bring it into register with the opening 26 in the stage 27 of the microscope 19. There is therefore no need to adjust the mirror of a supplemental light source in order to examine the slide or specimens placed upon the microscope stage.

From the foregoing it will be seen that there has been provided a microscope light source which may be carried from place to place with the microscope and is always available as a reliable source of illumination. The structure is light, easily mounted upon a microscope and will operate for an extremely long period of time without need for changing batteries.

Having thus fully described the invention, what is claimed as new and desired to be secured by Letters Patent of the United States, is:

1. A self-contained light source for attachment to the base of a microscope comprising, a case, a socket member carried by the case, a light bulb having a base thereon receivable within the socket and a central terminal, a first pair of contact members in said case, a second pair of contacts in the case opposite the first pair of contacts, a battery carried between the opposed contacts, a lead connecting the first pair of contacts to the base of the bulb, an electrically conductive spring arm connecting the second pair of contacts with the central terminal of the bulb, a switch leaf slidably received within the case overlying the spring arm and extending beyond each side of said case and a depending arm carried by the leaf and adapted to move the said spring arm out of contact with the bulb terminal to break the circuit from the batteries to the bulb.

2. A self-contained light source for attachment to the base of a microscope comprising; a case; a prong-shaped supporting pin carried by the wall of the case and extending outwardly therefrom, a socket member carried by the case; a light bulb having a base thereon receivable within the socket and a central terminal, a first pair of contact members in said case; a second pair of contacts in the case opposite the first pair of contacts, a battery carried between the opposed contacts; a lead connecting the first pair of contacts to the base of the bulb, an electrically conductive spring arm connecting the second pair of contacts with the central terminal of the bulb; a switch leaf slidably received within the case overlying the spring arm and extending beyond each side of said case and a depending arm carried by the leaf and adapted to move the said spring arm out of contact with the bulb terminal to break the circuit from the batteries to the bulb.

3. A self-contained light source for attachment to the base of a microscope comprising, a dielectric case, a prong-shaped supporting pin carried by the wall of the case and extending outwardly therefrom, a socket member carried by the case, a light bulb having a base thereon receivable within the socket and a central terminal, a first pair of spring contact members in said case, a second pair of spring contacts in the case opposite the first pair of contacts, a battery carried between the opposed contacts, a lead connecting the first pair of contacts to the base of the bulb, an electrically conductive spring arm connecting the second pair of contacts with the central terminal of the bulb; a switch leaf slidably received within the case overlying the spring arm and extending beyond each side of said case, depending fingers struck from the leaf spaced from each end thereof to limit the lateral movement of said leaf and a depending arm carried by the leaf and adapted to move the said spring arm out of contact with the bulb terminal to break the circuit from the batteries to the bulb.

References Cited in the file of this patent

UNITED STATES PATENTS

| | | |
|---|---|---|
| 1,316,050 | Lidberg | Sept. 16, 1919 |
| 2,329,897 | Heinicke | Sept. 21, 1943 |
| 2,528,701 | Mitchell | Nov. 7, 1950 |
| 2,707,227 | Ross | Apr. 26, 1955 |

FOREIGN PATENTS

| | | |
|---|---|---|
| 153,052 | Switzerland | Feb. 29, 1932 |